United States Patent
Kitamura

[11] Patent Number: 6,140,971
[45] Date of Patent: Oct. 31, 2000

[54] ANTENNA DEVICE HAVING FEEDING SPRING ESCAPE PREVENTION RIBS

[75] Inventor: Toshiyasu Kitamura, Yokohama, Japan

[73] Assignee: Matsushita Electric Industrial Co., Ltd., Osaka, Japan

[21] Appl. No.: 09/437,933

[22] Filed: Nov. 10, 1999

[30] Foreign Application Priority Data

Nov. 12, 1998 [JP] Japan .................................. 10-322145

[51] Int. Cl.⁷ ..................................................... H01Q 1/24
[52] U.S. Cl. ........................................... 343/702; 343/906
[58] Field of Search .................................... 343/702, 906, 343/715, 900, 901; 439/916, 347

[56] References Cited

U.S. PATENT DOCUMENTS

| | | | |
|---|---|---|---|
| 4,190,839 | 2/1980 | Liautaud | 343/715 |
| 5,603,630 | 2/1997 | Villain | 439/347 |
| 5,926,138 | 7/1999 | Eerikainen | 343/702 |
| 6,075,487 | 7/1999 | Ito | 343/702 |

FOREIGN PATENT DOCUMENTS

| | | |
|---|---|---|
| 0 347 268 | 12/1989 | European Pat. Off. . |
| 2 584 871 | 5/1986 | France . |
| 3233976 C1 | 8/1983 | Germany . |
| 41 26 604 A1 | 2/1993 | Germany . |
| 6-152212 | 5/1994 | Japan . |
| 8-139509 | 5/1996 | Japan . |

*Primary Examiner*—Tan Ho
*Attorney, Agent, or Firm*—Pearne & Gordon LLP

[57] ABSTRACT

An antenna device includes an antenna provided with a joining member for joining with a holder through a hole, a case comprising feeding spring escape/rotation prevention ribs provided parallel to the antenna insertion direction in the vicinity of the hole, the holder to be joined with the joining member inserted through the hole, and a feeding spring engaged astride around the holder.

7 Claims, 6 Drawing Sheets

ANTENNA DEVICE HAVING FEEDING SPRING ESCAPE PREVENTION RIBS

BACKGROUND OF THE INVENTION

1. Field of the Invention

The present invention relates to an antenna device to be assembled from the outside of an electronic appliance case of, for example, a radio appliance or a portable phone. In particular, it relates to a configuration comprising ribs in the case for preventing escape of a feeding spring.

2. Description of the Related Art

Conventionally, a configuration shown in FIG. 6 has been adopted for attaching the antenna onto the case in an antenna device to be assembled from the outside of an electronic appliance case of a radio appliance or a portable phone. That is, as shown in FIG. 6, an antenna 11 is fixed together with a holder 12 and a feeding spring 13 through an antenna inserting hole provided in a case 14 by screwing.

However, according to the conventional antenna device, a problem is involved in that since the holder 12 and the feeding spring 13 are fixed together by screwing, in the case the screw is loosened by any cause, the contact point of the feeding spring 13 is displaced so that the antenna device cannot function any longer.

SUMMARY OF THE INVENTION

Accordingly, an object of the invention is to provide an antenna device without the risk of displacement or escape of a feeding spring.

In order to solve the problems, an antenna device according to the invention comprises an antenna provided with a joining member for joining with a holder through a hole, a case comprising feeding spring escape prevention ribs provided parallel to the antenna insertion direction in the vicinity of the hole, the holder to be joined with the joining member inserted through the hole, and a feeding spring engaged astride around the holder.

Since a first aspect of the invention is an antenna device comprising an antenna provided with a joining member for joining with a holder through a hole, a case comprising feeding spring escape prevention ribs provided parallel to the antenna insertion direction in the vicinity of the hole, the holder to be joined with the joining member inserted through the hole, and a feeding spring engaged astride around the holder, the effect of preventing escape of the feeding spring can be achieved.

Moreover, since a second aspect of the invention is an antenna device comprising an antenna provided with a joining member for joining with a holder through a hole, a case comprising feeding spring rotation prevention ribs provided parallel to the antenna insertion direction in the vicinity of the hole, the holder to be joined with the joining member inserted through the hole, and a feeding spring engaged astride around the holder, the effect of preventing displacement of the feeding spring can be achieved.

Furthermore, since a third aspect of the invention is the antenna device according to the first or second aspect, wherein an inclination is formed at the tip portion of the ribs in the direction for mounting the feeding spring, the effect of simplifying attachment of the holder and the feeding spring can be achieved.

Moreover, since a fourth aspect of the invention is the antenna device according to any of the first to third aspects, wherein a curvature is formed at the tip portion of the ribs along the antenna insertion direction, the effect of simplifying attachment of the holder and the feeding spring can be achieved.

Furthermore, since a fifth aspect of the invention is the antenna device according to the first aspect, wherein the ribs are provided parallel to the antenna insertion direction at least at one point of one side in the vicinity of the hole, the effect of preventing escape of the feeding spring can be achieved.

Moreover, since a sixth aspect of the invention is the antenna device according to the second aspect, wherein the ribs are provided parallel to the antenna insertion direction at least at one point of one side in the vicinity of the hole, the effect of preventing escape of the feeding spring can be achieved.

Furthermore, since a seventh aspect of the invention is a portable radio electronic appliance comprising the antenna device according to any of the first to sixth aspects, the effect of preventing escape or rotation of the feeding spring in the portable radio electronic appliance can be achieved.

DETAILED DESCRIPTION OF THE PREFERRED EMBODIMENTS

Hereinafter, an embodiment of the invention will be explained with reference to the accompanied drawings.

Figure 1:
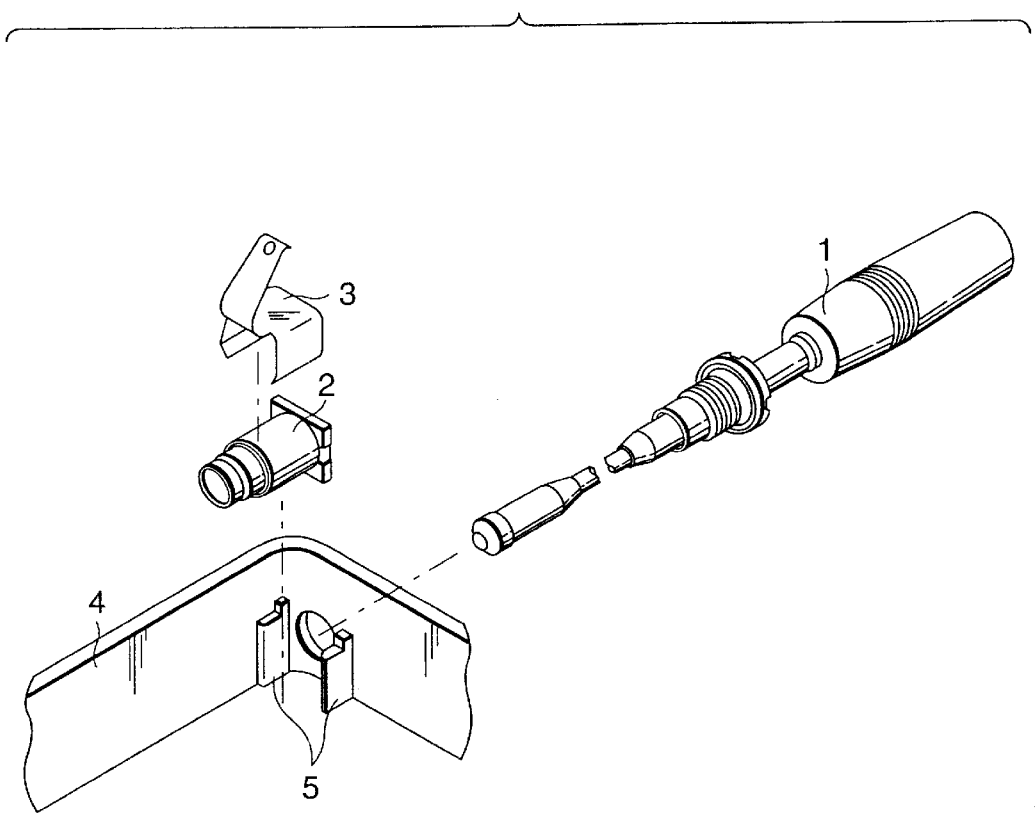
FIG. 1 is an exploded perspective view showing the configuration of an antenna device according to an embodiment of the invention.

FIG. 1 is an exploded perspective view showing the configuration of an antenna device according to the invention. In FIG. 1, the antenna device comprises an antenna 1 provided with a joining member for joining with a holder 2 through a hole, a case 4 comprising feeding spring escape/rotation prevention ribs 5 provided parallel to the antenna insertion direction in the vicinity of the hole, the holder 2 to be joined with the joining member inserted through the hole, and a feeding spring 3 engaged astride around the holder 2.

Figure 2:
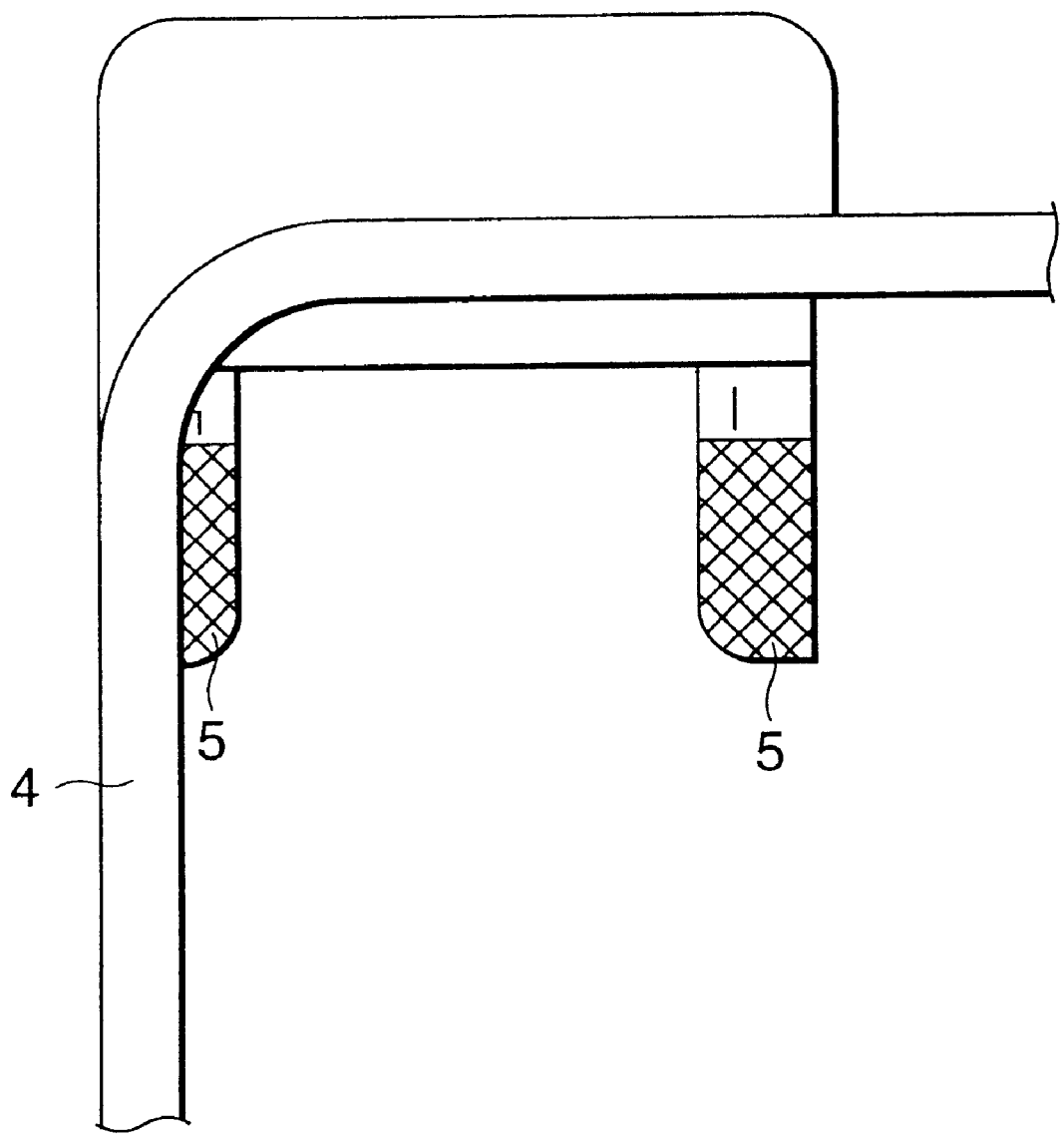
FIG. 2 is a plan view of the vicinity of the hole of the case in the antenna device according to the embodiment of the invention, viewed from above.

FIG. 2 is a plan view of the vicinity of the hole of the case viewed from above. It is observed that the feeding spring escape/rotation prevention ribs 5 are provided parallel to the antenna insertion direction from the case 4. Moreover, it is observed that a curvature (R) is formed at the tip portion of the feeding spring escape/rotation prevention ribs 5 along the antenna insertion direction. The curvature (R) is formed for facilitating attachment of the parts.

Figure 3:
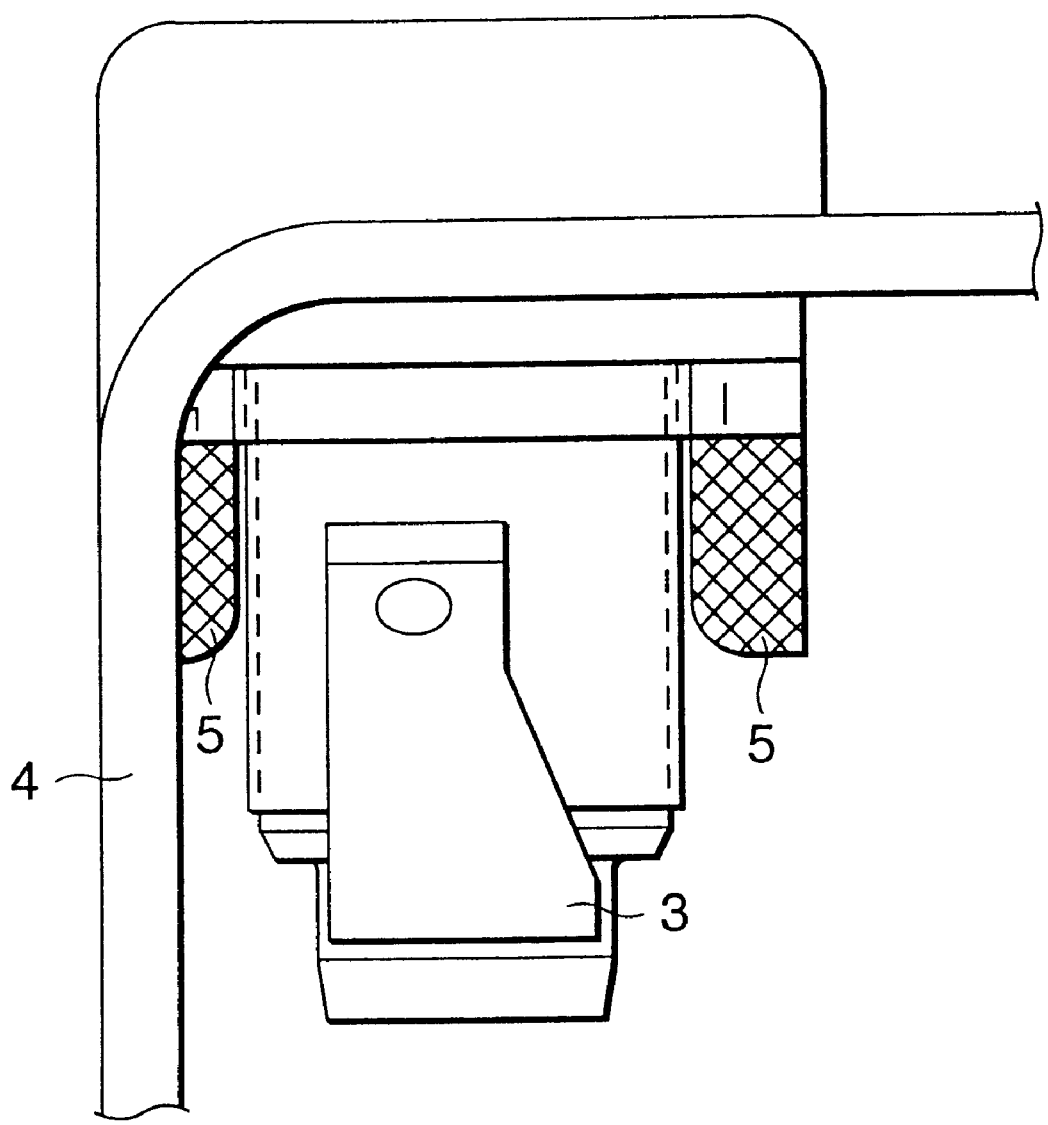
FIG. 3 is a plan view showing the state with the holder and the feeding spring mounted in the antenna device according to the embodiment of the invention.

FIG. 3 is a plan view showing the state with the holder 2 and the feeding spring 3 mounted further to the state of FIG. 2. The positional relationship among the holder 2, the feeding spring 3 and the feeding spring escape/rotation prevention ribs 5 can be observed.

Figure 4:
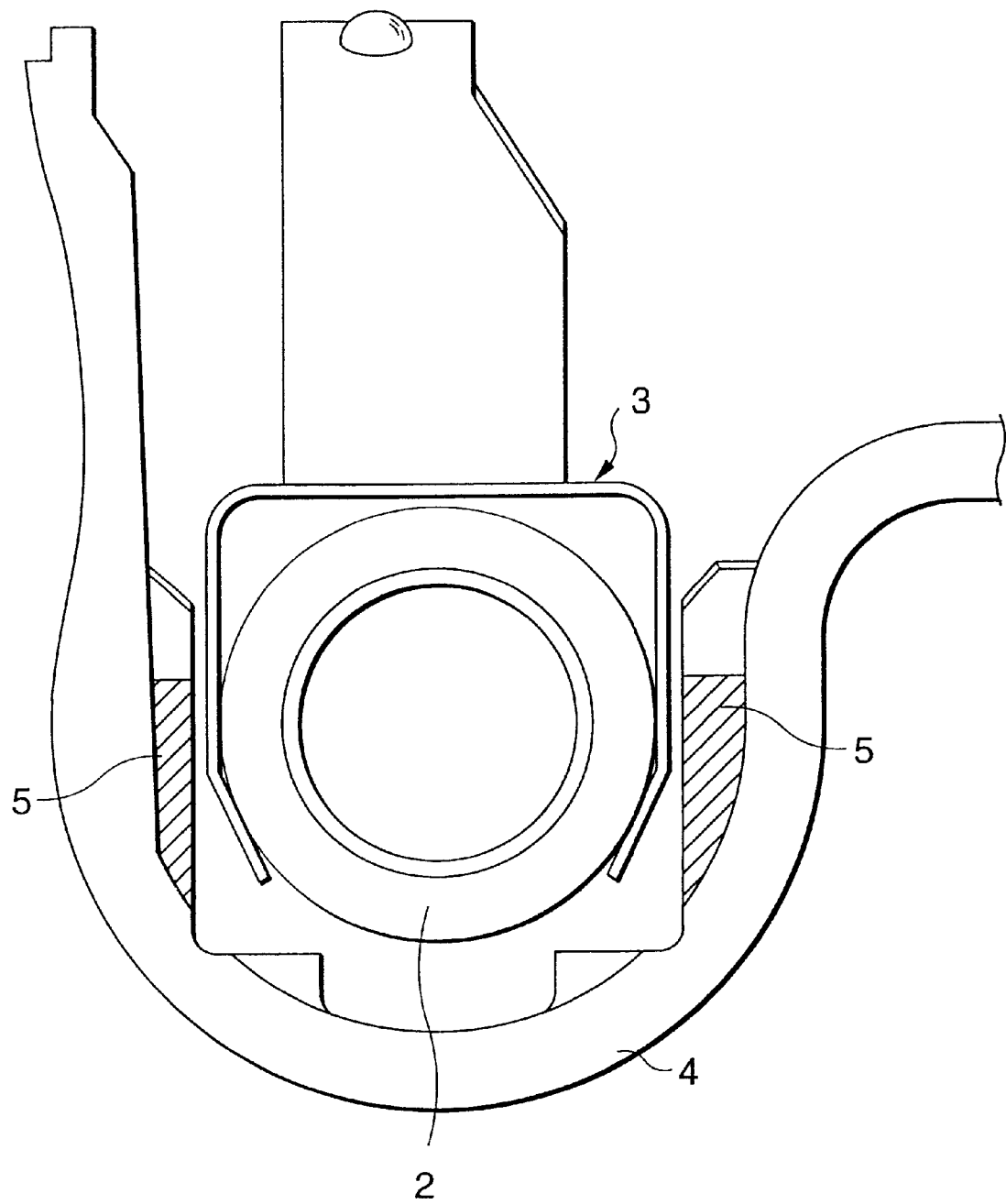
FIG. 4 is an enlarged elevation view showing the configuration of the antenna device according to the embodiment of the invention immediately before completion of the assembly, viewed from the inside of the case.

FIG. 4 is an enlarged elevation view showing the configuration of the antenna device immediately before completion of the assembly, viewed from the inside of the case. FIG. 4 shows the state wherein the antenna is joined with the holder 2 already, and the feeding spring 3 is being attached onto the holder 2 by applying pressure. That is, it is understood that since the pressure is applied onto the feeding spring 3 for mounting on the holder 2, the feeding spring 3 can be mounted with the tip portion thereof placed around the holder 2 as well as the surface having the contact point astride on the surface of the holder 2 without contacting with the feeding spring escape/rotation prevention ribs 5. It is observed that an inclination is formed at the tip portion of the feeding spring escape/rotation prevention ribs 5 in the direction for mounting the feeding spring 3.

Figure 5:
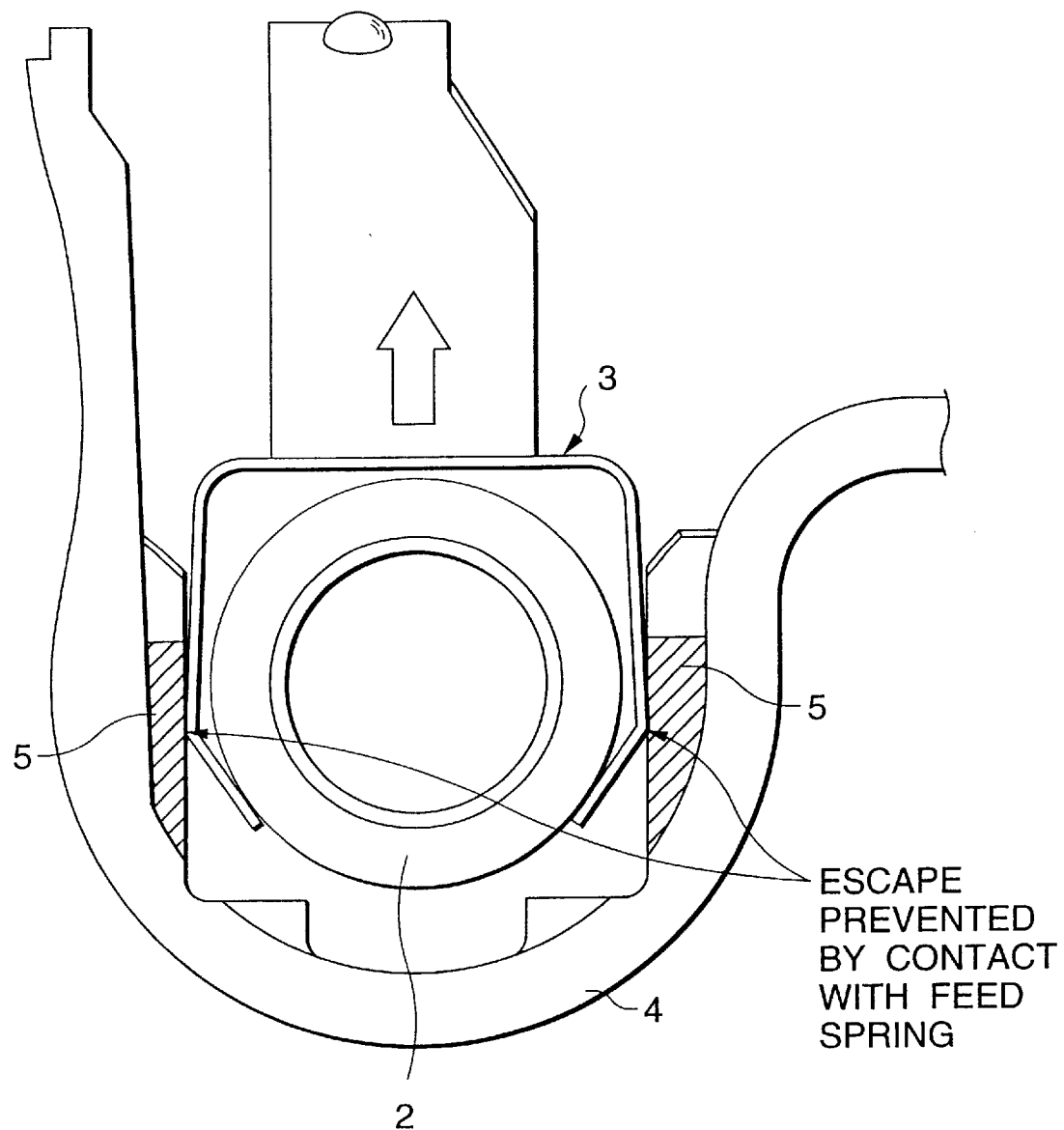
FIG. 5 is an enlarged elevation view showing the configuration of the antenna device according to the embodiment of the invention in the state after completion of the assembly, viewed from the inside of the case.
Figure 6:
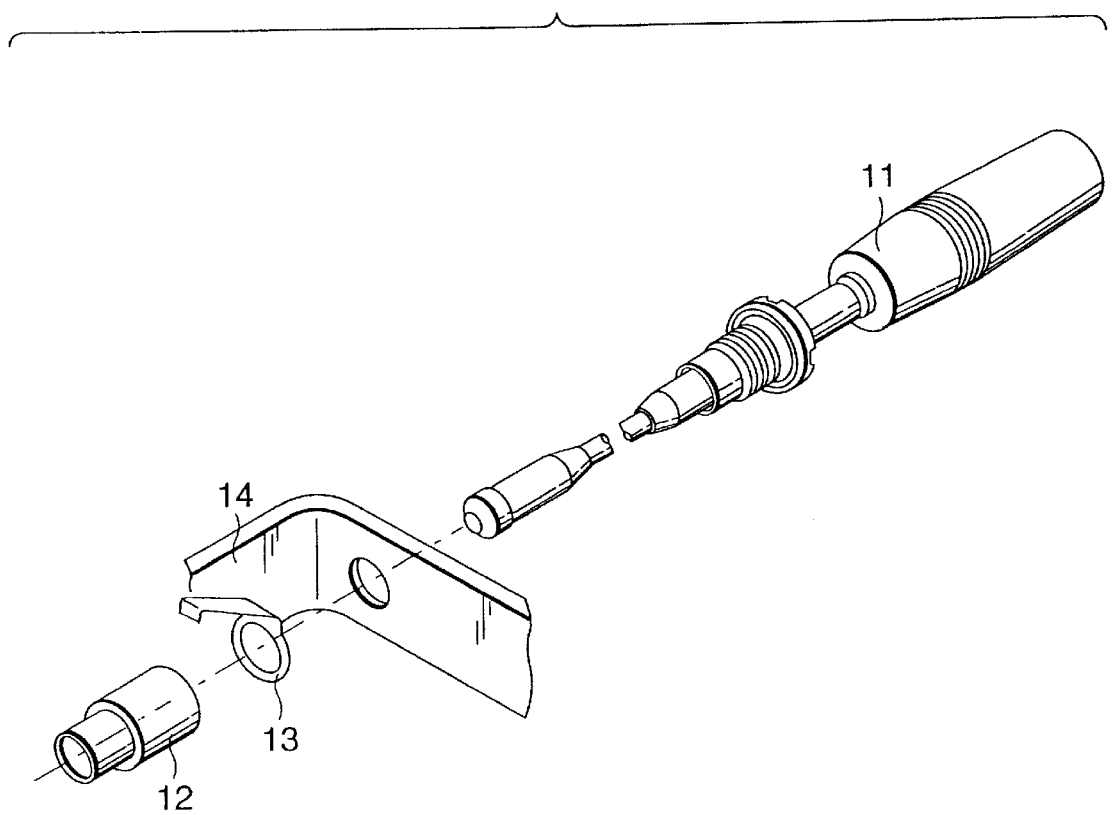
FIG. 6 is an exploded perspective view showing the configuration of a conventional antenna device.

FIG. 5 is an enlarged elevation view showing the configuration of the antenna device in the state after completion of the assembly, viewed from the inside of the case. Since assembly of the antenna device has been completed already in FIG. 5, for example, in the case a force of pulling out the feeding spring 3 is applied in the arrow direction, the feeding spring 3 is contacted with the feeding spring escape/rotation prevention ribs 5 owing to the spring force of the feeding spring 3 so that the feeding spring 3 cannot be pulled out owing to inhibition by the feeding spring escape/rotation prevention ribs 5.

Moreover, in the case a rotational force is applied on the feeding spring 3, the feeding spring 3 is contacted with the feeding spring escape/rotation prevention ribs 5 owing to the spring force of the feeding spring 3 so that the feeding spring 3 cannot be rotated owing to inhibition by the feeding spring escape/rotation prevention ribs 5.

As is apparent from the explanation above, since the invention comprises an antenna provided with a joining member for joining with a holder through a hole, a case comprising feeding spring escape/rotation prevention ribs provided parallel to the antenna insertion direction in the vicinity of the hole, the holder to be joined with the joining member inserted through the hole, and a feeding spring engaged astride around the holder, the effect of preventing escape or rotation

What is claimed is:

1. An antenna device comprising:

an antenna provided with a joining member for joining with a holder through a hole; and a case having feeding spring escape prevention ribs provided in parallel to the antenna insertion direction in the vicinity of the hole, holder to be joined with the joining member inserted through the hole, and a feeding spring engaged astride around the holder.

2. The antenna device according to claim 1, wherein the ribs are provided parallel to the antenna insertion direction at least one point of one side in the vicinity of the hole.

3. An antenna device comprising:

an antenna provided with a joining member for joining with a holder through a hole;

a case including feeding spring rotation prevention ribs provided in parallel to the antenna insertion direction in the vicinity of the hole, a holder to be joined with the joining member inserted through the hole, and a feeding spring engaged astride around the holder.

4. The antenna device according to claim 1 or 3, wherein an inclination is formed at the tip portion of the ribs in the direction for mounting the feeding spring.

5. The antenna device according to claim 1 or 3, wherein a curvature is formed at the tip portion of the ribs along the antenna insertion direction.

6. The antenna device according to claim 3, wherein the ribs are provided parallel to the antenna insertion direction at least at one point of one side in the vicinity of the hole.

7. A portable radio electronic appliance comprising the antenna device according to claim 1 or 3.

* * * * *

UNITED STATES PATENT AND TRADEMARK OFFICE
CERTIFICATE OF CORRECTION

PATENT NO. : 6,140,971
DATED : October 31, 2000
INVENTOR(S) : Kitamura

Page 1 of 1

It is certified that error appears in the above-identified patent and that said Letters Patent is hereby corrected as shown below:

On Title Page,
Section [54], after "DEVICE", delete -- HAVING FEEDING SPRING ESCAPE PREVENTION RIBS --.

Column 1,
Lines 1-2, after "DEVICE", delete -- HAVING FEEDING SPRING ESCAPE PREVENTION RIBS --.

Signed and Sealed this

Twenty-fourth Day of July, 2001

Attest:

*Nicholas P. Godici*

NICHOLAS P. GODICI
*Attesting Officer*   *Acting Director of the United States Patent and Trademark Office*